US010164264B2

United States Patent
Kozal et al.

(10) Patent No.: US 10,164,264 B2
(45) Date of Patent: Dec. 25, 2018

(54) METHOD AND APPARATUS FOR MANUFACTURING A FUEL CELL ELECTRODE

(75) Inventors: Michael D. Kozal, Caledonia, MI (US);
Peter Wojtas, Grand Rapids, MI (US);
William Kanouse, Rockford, MI (US);
Stacey Broom, Jenison, MI (US);
Roger L. Whitley, Wyoming, MI (US)

(73) Assignee: Pridgeon & Clay, Inc., Grand Rapids, MI (US)

( * ) Notice: Subject to any disclaimer, the term of this patent is extended or adjusted under 35 U.S.C. 154(b) by 1195 days.

(21) Appl. No.: 14/005,285

(22) PCT Filed: Mar. 15, 2012

(86) PCT No.: PCT/US2012/029193
§ 371 (c)(1),
(2), (4) Date: Nov. 8, 2013

(87) PCT Pub. No.: WO2012/125804
PCT Pub. Date: Sep. 20, 2012

(65) Prior Publication Data
US 2014/0093813 A1 Apr. 3, 2014

Related U.S. Application Data

(60) Provisional application No. 61/452,889, filed on Mar. 15, 2011.

(51) Int. Cl.
*H01M 4/88* (2006.01)
*H01M 8/021* (2016.01)
(Continued)

(52) U.S. Cl.
CPC ........ *H01M 4/8875* (2013.01); *H01M 8/021* (2013.01); *H01M 8/0228* (2013.01);
(Continued)

(58) Field of Classification Search
CPC ....................................................... H01M 4/88
See application file for complete search history.

(56) References Cited

U.S. PATENT DOCUMENTS 6,037,074 A * 3/2000 Mercuri .............. H01M 8/0213
428/163
6,413,671 B1 * 7/2002 Mercuri ................ C04B 35/536
423/448
(Continued)

FOREIGN PATENT DOCUMENTS

JP 2002313354 A 10/2002
JP 2006302700 A 11/2006
(Continued)

*Primary Examiner* — Sarah A. Slifka
*Assistant Examiner* — Brian R Ohara
(74) *Attorney, Agent, or Firm* — McGarry Bair PC

(57) ABSTRACT

A method of manufacturing a fuel cell electrode includes stamping an electrode workpiece (50, 50') in a sequence configured to control and/or reduce material growth, such as stamping discrete sections of the electrode workpiece in a sequential order. The method can employ a die with a die face (18, 18') having a plurality of projections (24, 24'), wherein each projection has a top surface (26, 26') with a concave curve along at least one plane to control and/or reduce material growth during a stamping operation.

15 Claims, 17 Drawing Sheets

(51) Int. Cl.
*H01M 8/0228* (2016.01)
*H01M 8/0258* (2016.01)
*H01M 8/0273* (2016.01)
*H01M 8/0267* (2016.01)
*H01M 8/1018* (2016.01)

(52) U.S. Cl.
CPC ....... *H01M 8/0258* (2013.01); *H01M 8/0273* (2013.01); *H01M 8/0267* (2013.01); *H01M 2008/1095* (2013.01); *Y02P 70/56* (2015.11)

(56) References Cited

U.S. PATENT DOCUMENTS

| | | | |
|---|---|---|---|
| 2002/0022570 A1* | 2/2002 | Reynolds, III | C04B 35/536 502/101 |
| 2002/0164483 A1* | 11/2002 | Mercuri | B32B 18/00 428/408 |
| 2003/0131646 A1* | 7/2003 | Herzog | B21D 13/02 72/379.2 |

FOREIGN PATENT DOCUMENTS

| | | | |
|---|---|---|---|
| JP | 2008041456 A | 2/2008 | |
| JP | 2010040249 A | 2/2010 | |
| JP | 2010073622 A | 4/2010 | |

* cited by examiner

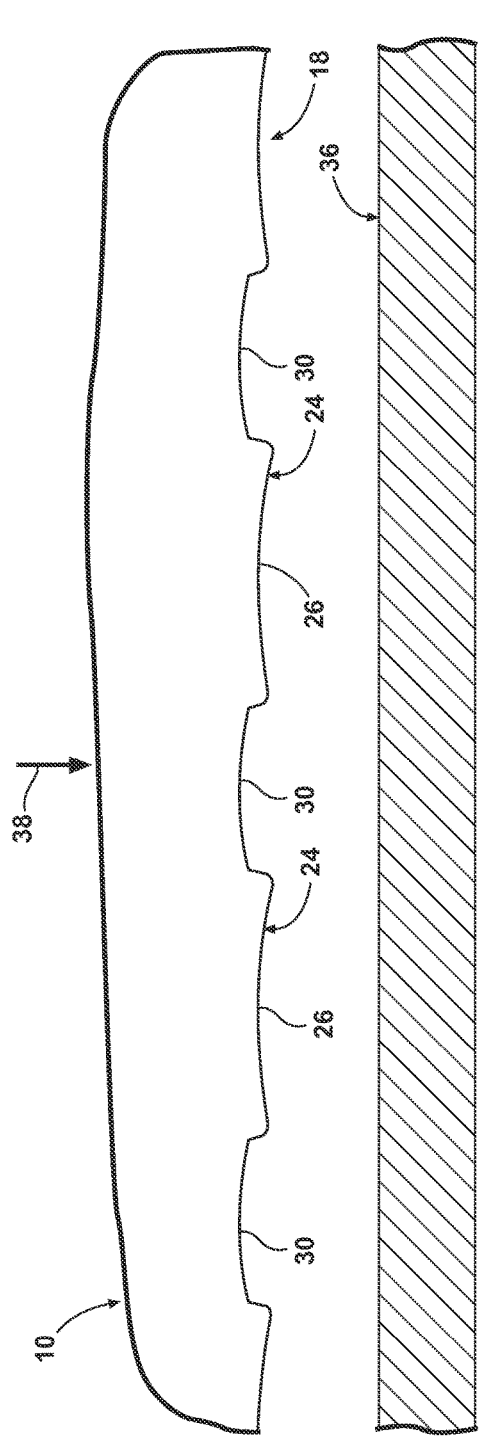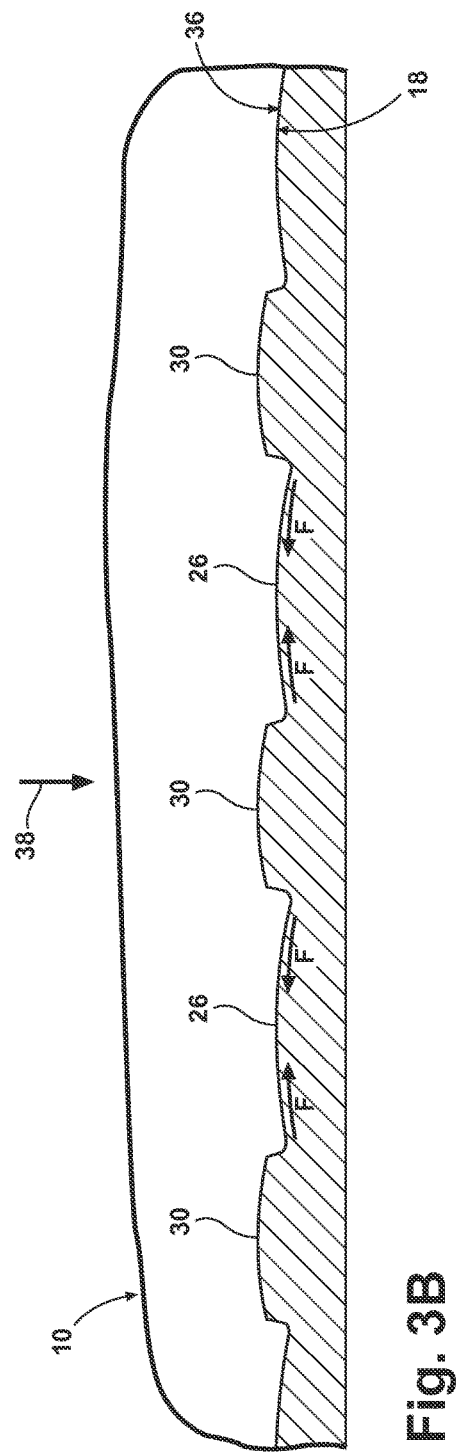
Fig. 3A
Fig. 3B

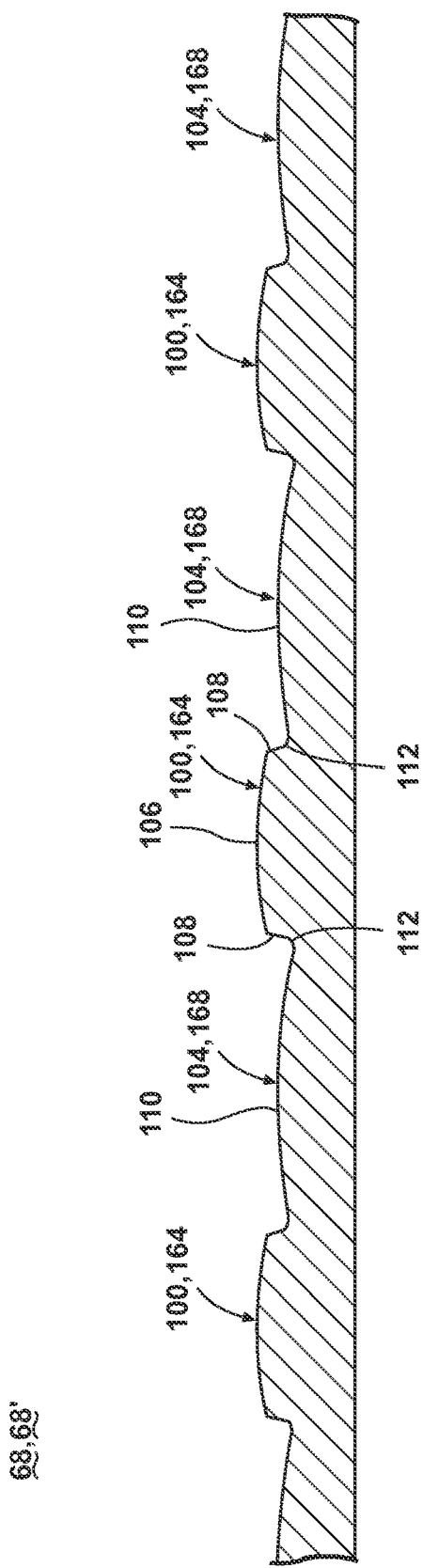

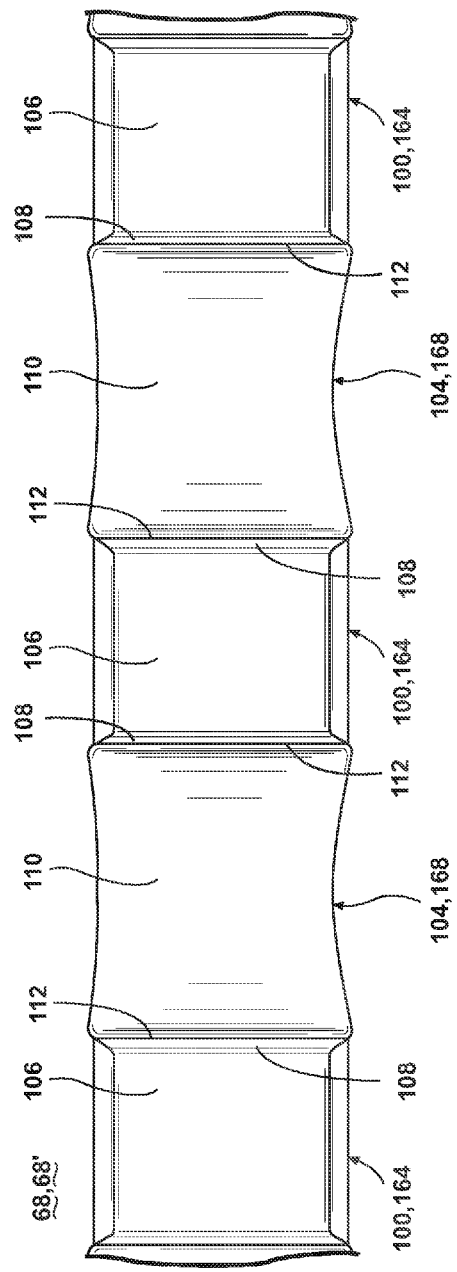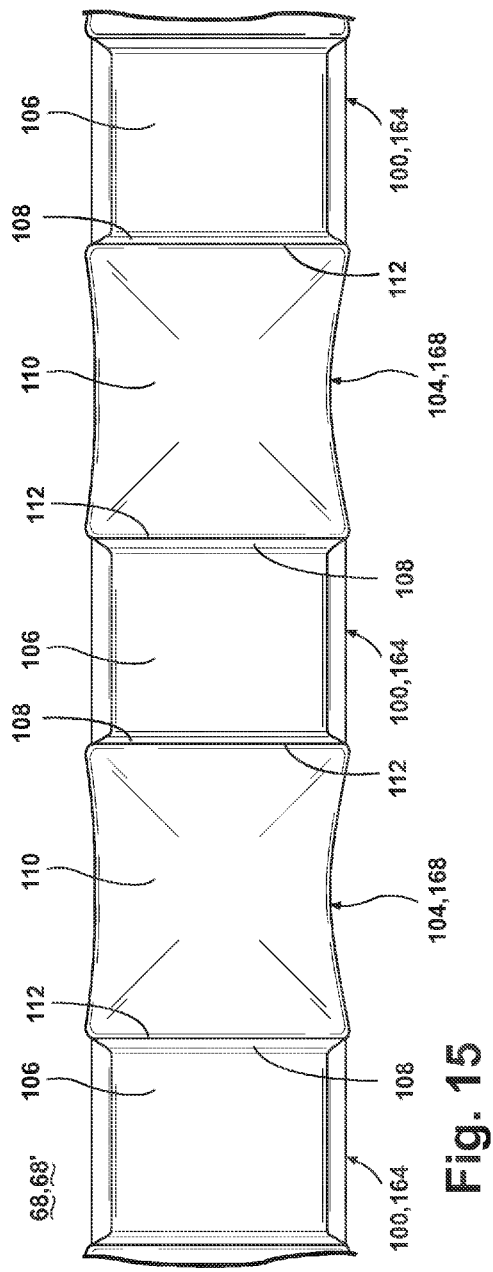

METHOD AND APPARATUS FOR MANUFACTURING A FUEL CELL ELECTRODE

CROSS REFERENCE TO RELATED APPLICATIONS

This application is a National Phase application of International Application No. PCT/US2012/029193, filed Mar. 15, 2012, which claims the benefit of U.S. Provisional Application No. 61/452,889, filed Mar. 15, 2011, both of which are incorporated herein by reference in their entirety.

BACKGROUND OF THE INVENTION

Fuel cells typically include a fuel electrode, or anode, and an oxidant electrode, or cathode, which are separated by an electrolyte or ion-conducting membrane. The anode and cathode can include flow channels, which defines a flow path for distributing gaseous reactants (i.e. a fuel and an oxidant) and a coolant over the surfaces of the electrodes. Flow channels have previously been created in fuel electrodes by a chemical etching process.

BRIEF SUMMARY

According to one aspect of the invention, a method of manufacturing a fuel cell electrode from an electrode workpiece comprises stamping the electrode workpiece in a sequence configured to control and/or reduce material growth.

According to another aspect of the invention, a die for stamping a fuel cell electrode comprises a die face having a plurality of projections, wherein each projection comprises a surface that has a concave curve along at least one plane to control and/or reduce material growth during a stamping operation.

BRIEF DESCRIPTION OF THE DRAWINGS

In the drawings:

FIGS. 3A-3B are schematic side views of a stamping operating using the die of FIGS. 1-2 to produce a fuel cell electrode.

FIG. 13 is a close-up side view of a portion of the cathode and anode from FIG. 9 and 11, respectively.

FIG. 14 is a close-up, top view of FIG. 13.

FIG. 15 is a close-up, top view of a portion of a cathode and anode at least partially manufactured using the die of FIG. 4.

DETAILED DESCRIPTION

The present invention relates to an apparatus and method for producing a fuel cell. Specifically, the apparatus and method of the invention can be used to manufacture an electrode for a fuel cell. As used herein, the term electrode may refer to the anode or the cathode of a fuel cell. The anode and/or cathode can, for example. be used as part of a solid oxide fuel cell (SOFC) or a polymer exchange membrane fuel cell (PEMFC).

Figure 1:
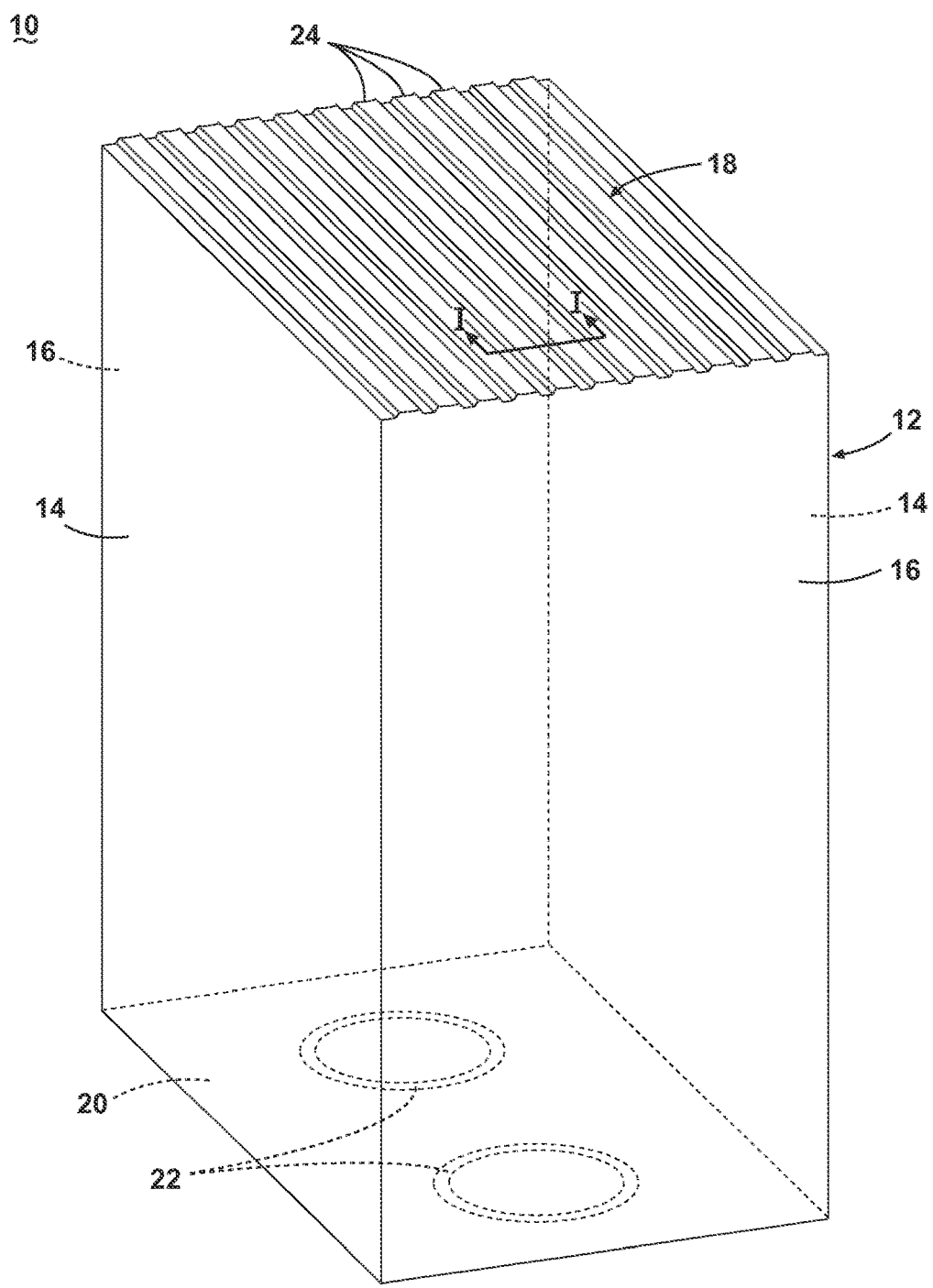
FIG. 1 is a bottom perspective view of a stamping die according to one embodiment of the invention that can be used to manufacturing a fuel cell electrode.

FIG. 1 is a bottom perspective view of a stamping die 10 according to one embodiment of the invention that can be used to manufacturing a fuel cell electrode. The die 10 can comprise a die body 12 having a first pair of side surfaces 14 joined to a second pair of side surfaces 16, all of which are joined by a die face 18 that will press against the workpiece during stamping and a rear face 20, which may have attachment features 22 which are used to attach the die 10 to a stamping machine. The die face 18 is formed by plurality of raised projections 24 which corresponds in negative form with the formation or impression to be stamped into the electrode workpiece. Each projection 24 can extend generally along the length of the die face 18, generally parallel to the first pair of side surfaces 14.

Figure 2:
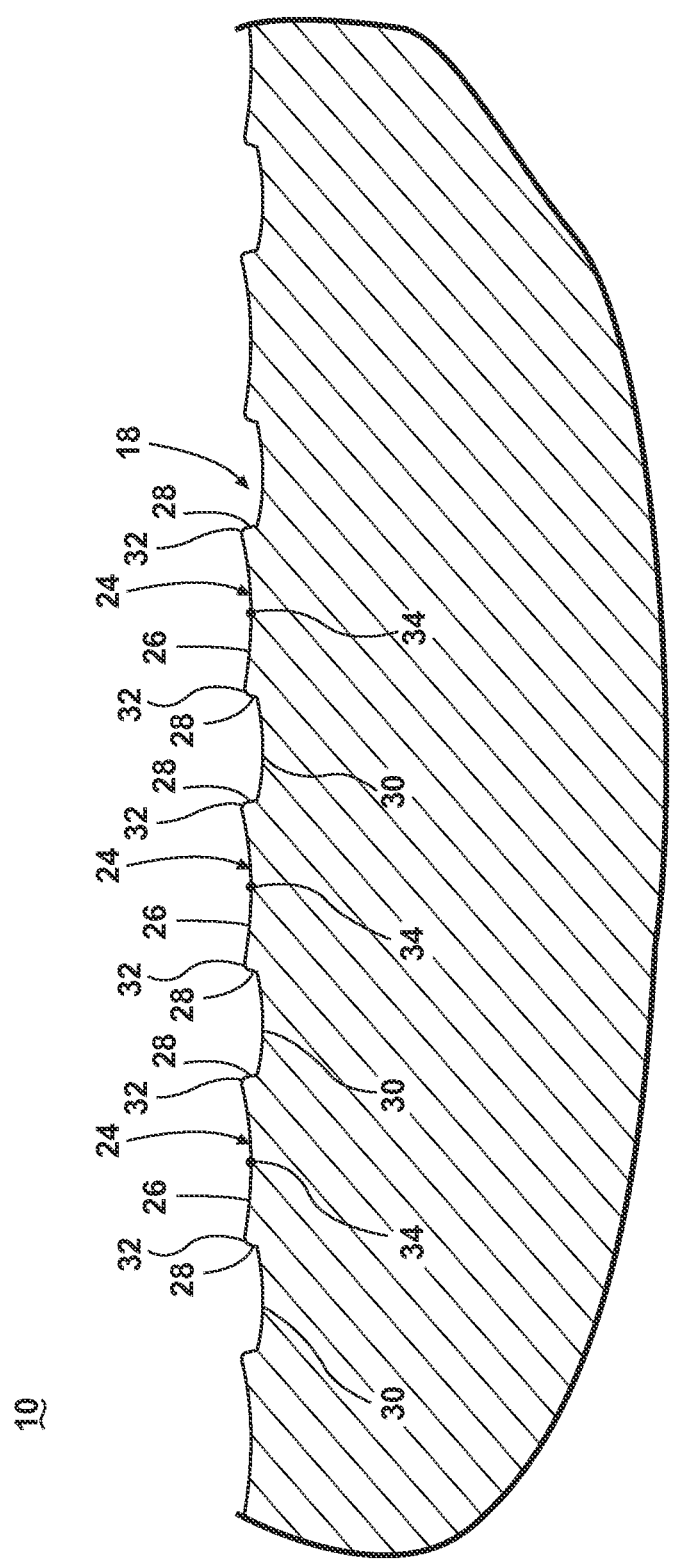
FIG. 2 is a close-up, cross-sectional view of the die through line I-I of FIG. 1.

FIG. 2 is a close-up, cross-sectional view of the die 10 through FIG. 1. Each projection 24 can comprise a top surface 26 and two lateral sides 28 that join the top surface 26 at one end thereof. At an opposite end, the lateral sides 28 join a plateau 30, which extends between the lateral sides 28 of adjacent projections 24. The top surface 26 can have a concave curve in at least a single plane, such that the projection 24 has a bowed pressing surface when viewed from the perspective of FIG. 2. The lateral sides 28 can be angled, such that the ends of the lateral sides 28 joined to the top surface 26 are closer together than the ends of the lateral sides 28 joined to the plateau 30. Each lateral side 28 can join the top surface 26 at a raised shoulder 32. The shoulder 32 may be rounded, slightly pointed, or pointed, among other configurations. The shoulders 32 may define the highest points on the die face 18 with respect to the plateau 30. An imaginary line extending along each top surface 26, generally parallel to the first pair of side surfaces 14, may define the lowest point or nadir 34 in the top surface 26. The nadir 34 of a given projection 24 can be equidistant from the shoulders 32 of the projection 24.

FIGS. 3A-3B are schematic side views of a stamping operating using the die 10 of FIGS. 1-2 to produce a fuel cell electrode. In FIG. 3A, the die face 18 of the die 10 is pressed against a workpiece 36 along press direction 38. The die 10 deforms the workpiece 36 by stressing the material to induce plastic flow. In FIG. 3B, a portion of the plastic flow of the material due to the force imposed on the workpiece 36 by the die 10 is indicated by arrows F. The direction and magnitude of plastic flow determines how much material growth the workpiece 36 undergoes. The structural configuration of the die 10 can reduce material growth. The bowed or curved top surface 26 in particular serves as a guide for the deformation of the material. As shown in FIG. 3B, the curved top surfaces 26 of the die 10 compresses the material of the workpiece 36 at least laterally inwardly from two opposing directions. Thus, at least some of the plastic flow F is guided inwardly, which prevents or reduces material growth. It should be noted that the arrows F in FIG. 3B do not represent all of the plastic flow the workpiece 36 will undergo during stamping; rather the arrows F simply represent the local plastic flow in the region of the curved top surfaces 26.

Figure 4:
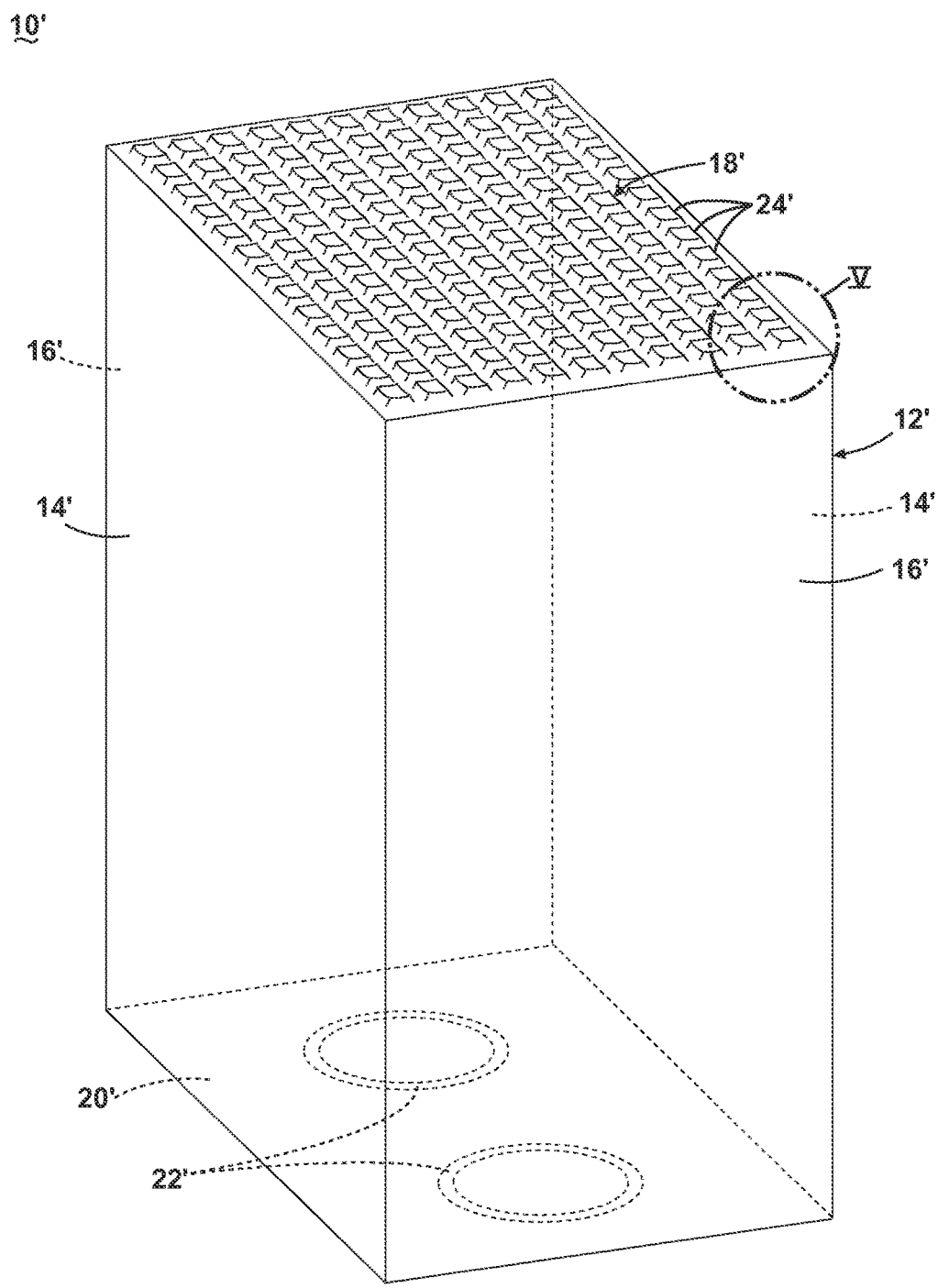
FIG. 4 is a bottom perspective view of a stamping die according to another embodiment of the invention that can be used to manufacture a fuel cell electrode.

FIG. 4 is a bottom perspective view of a stamping die 10' according to another embodiment of the invention that can be used to manufacture a fuel cell electrode. The die 10' may be similar to the die 10 of FIGS. 1-2, but may be provided with a die face 18' comprising an array of raised projections 24'. The projections 24' may be arranged in a grid-like pattern across the die face 18'.

Figure 5:
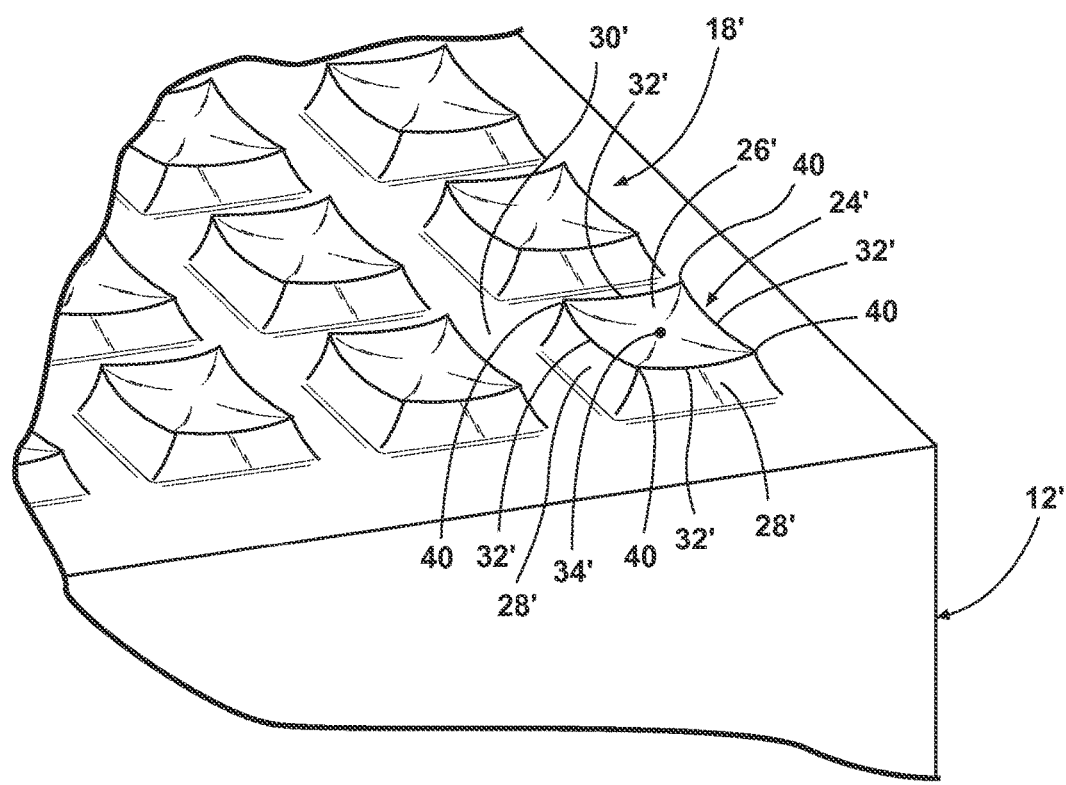
FIG. 5 is a close-up view of section V of the die of FIG. 4.

FIG. 5 is a close-up view of section V of the die of FIG. 4. The top surface 26' of each projection 24'can be curved in at least two perpendicular planes, such that the projection 24' has a concave or cup-shaped pressing surface. The top surface 26' will still appear to have a bowed upper surface when viewed from a perspective similar to FIG. 2. Four lateral sides 28' join the top surface 26' of each projection 24' at a raised shoulder 32'. At an opposite end, the lateral surfaces 28' join a common plateau 30', which extends between the array of projections 24'. In addition, each projection 24' can have four raised corners 40, which may be rounded, slightly pointed, or pointed, among other configurations. The corners 40 may define the highest points on the die face 18' with respect to the plateau 30'. A low point or nadir 34' is formed in the top surface 26' of each projection 24'. The nadir 34' of a given projection 24' can be equidistant from the corners 40 of the projection 24'.

Figure 6A:
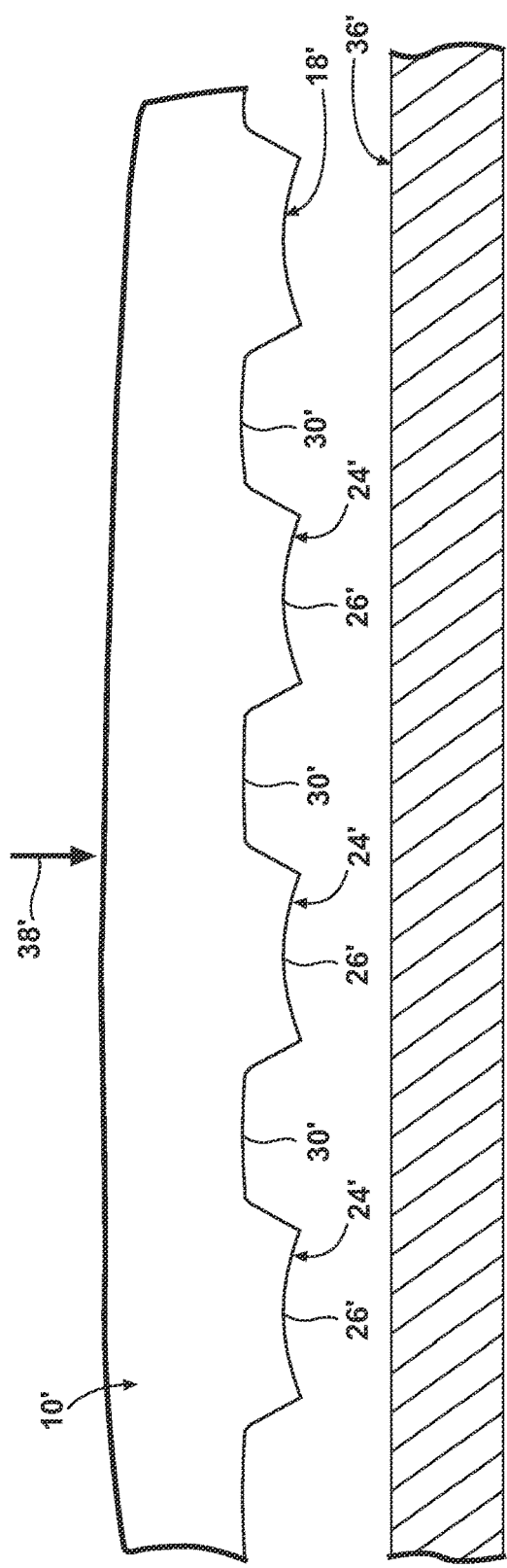
FIGS. 6A-6B are a schematic side pie and a schematic bottom perspective view, respectively, of a stamping operating using the die of FIGS. 4-5 to produce a fuel cell electrode.
Figure 6B:
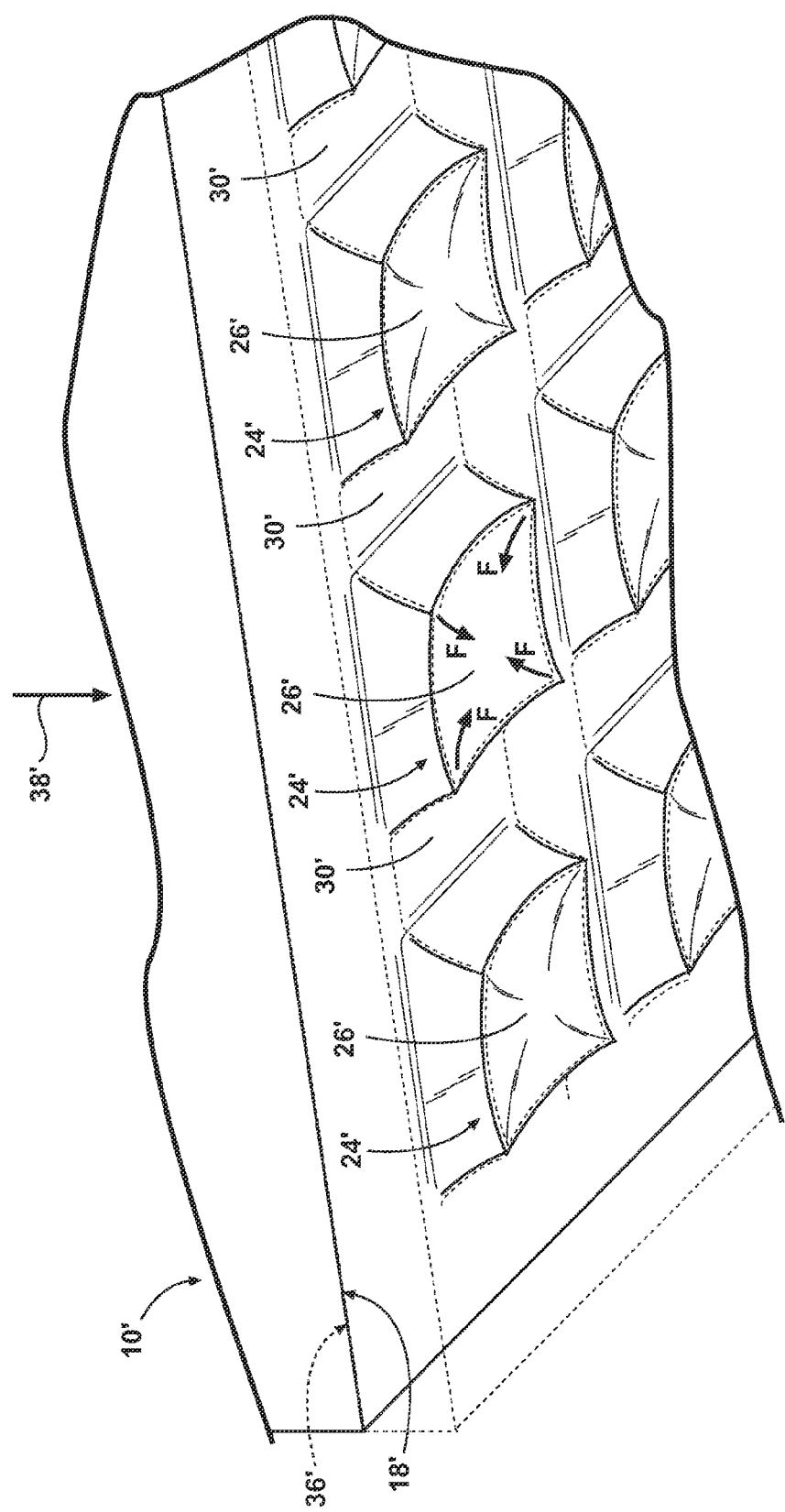

FIGS. 6A-6B are a schematic side view and a schematic bottom perspective view, respectively, of a stamping operating using the die 10' of FIGS. 4-5 to produce a fuel cell electrode. In FIG. 6A, the die face 18' of the die 10' is pressed against a workpiece 36' along press direction 38'. The die 10' deforms the workpiece 36'by stressing the material to induce plastic flow. In FIG. 63, a portion plastic flow of the due to the force imposed on the workpiece 36' by the die 10 is indicated by arrows F. The structural configuration of the die 10 can reduce material growth. The concave or cup-shaped surface 26' in particular serves as a guide for the deformation of the material. As shown in FIG. 63, the concave surfaces 26' of the die 10 compresses the material of the workpiece 36'. Thus, at least some of the plastic flow F is guided inwardly, which prevents or reduces material growth. It should be noted that the arrows F in FIG. 6B do not represent all of the plastic flow the workpiece 36' will undergo during stamping; rather the arrows F simply represent the local plastic flow in the region of the concave surfaces 26'.

Figure 7:
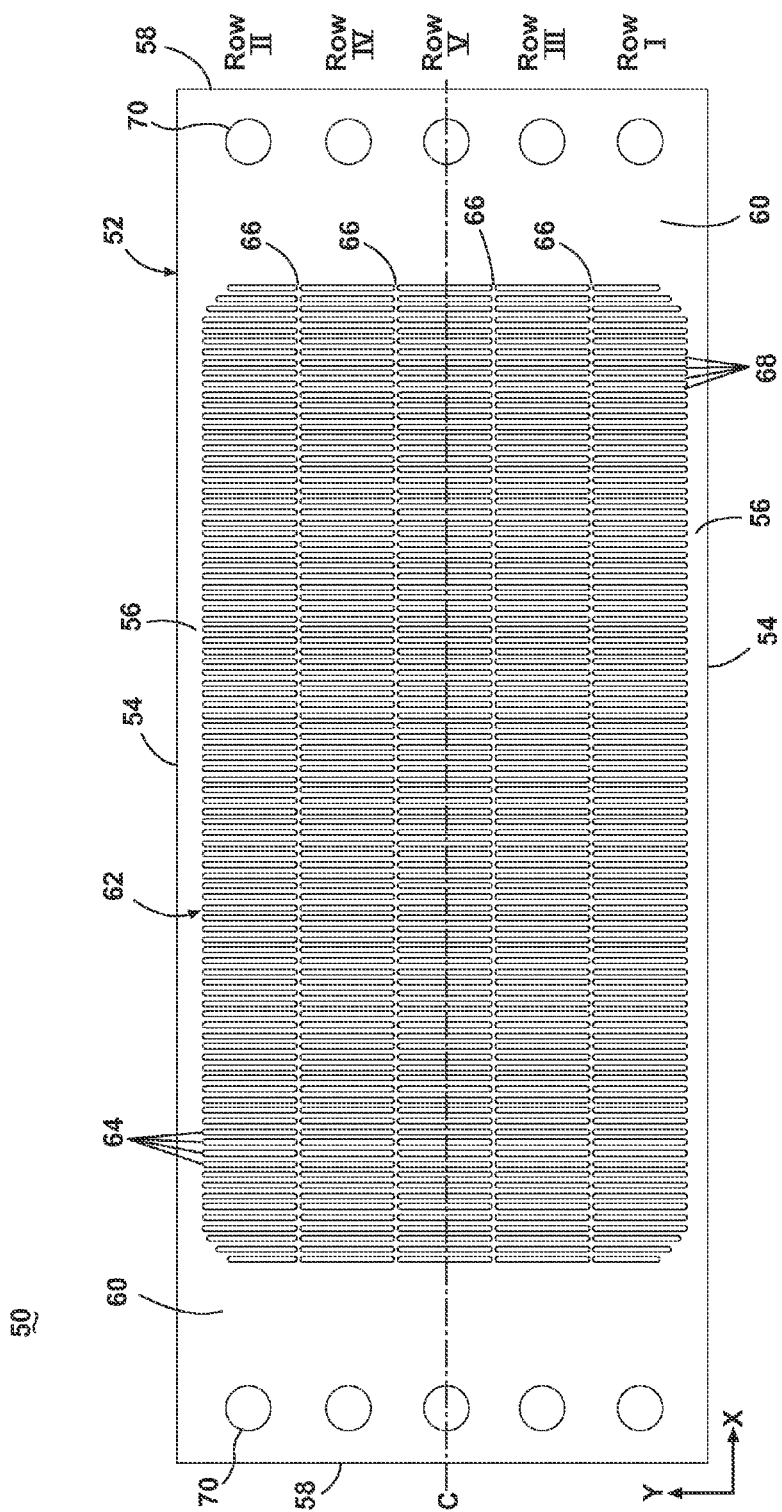
FIG. 7 is a plan view of one embodiment of a blank which can be used to make a cathode according to the method of the invention.

FIG. 7 is a plan view of one embodiment of a blank 50 which can be used to make a cathode according to the method of the invention. The blank 50 comprises a flat sheet 52 having two lateral sides 54 which define lateral margins 56 of the sheet 52 and two end sides 58, which define the end margins 60 of the sheet 52 and which are shorter in length than the lateral sides 54. The blank 50 has a longitudinal centerline C extending through the middle of the slotted region 62. Conceptually, a Cartesian coordinate system can be applied to the blank 50, with an X-axis extending parallel to one of the lateral sides 54, a Y-axis extending parallel to one of the end sides 58, and a Z-axis (not shown) extending in a direction normal to the page. The X-axis and other axes parallel thereto define an "X-direction" of the blank 50, the Y-axis and other axes parallel thereto define a "Y-direction" of the blank 50. Likewise, the Z-axis and other axes parallel thereto define a "Z-direction" of the blank 50. The blank 50 is preferably made from a rigid metal material, such as carbon-based stainless steel, ferritic and non-ferritic stainless steels, and clad materials using a stainless steel substrate. The blank 50 can have a thickness of approximately 1.0 mm in the Z-direction.

The blank 50 can includes some preformed features. For the illustrated blank 50, the preformed features include a central slotted region 62 comprising an array of opening or slots 64 formed in the sheet 52. The slots 64 can be formed by stamping, punching, laser cutting, or any other suitable method. The slots 64 can be arranged in multiple rows extending in the X-direction and multiple columns extending in the Y-direction. Adjacent rows of slots 64 are separated from each other by struts 66. Adjacent columns of slots 64 are separated from each other by ribs 68.

As illustrated, five rows of slots 64 are provided in the blank 50, and are labeled Row I through Row V. The slots 64 may be generally identical in size, with the exception of the slots 64 located near the ends of Row I and Row II, which may have different lengths to create curved corners on the array, and which eventually define curved corners of the cathode.

Figure 8:
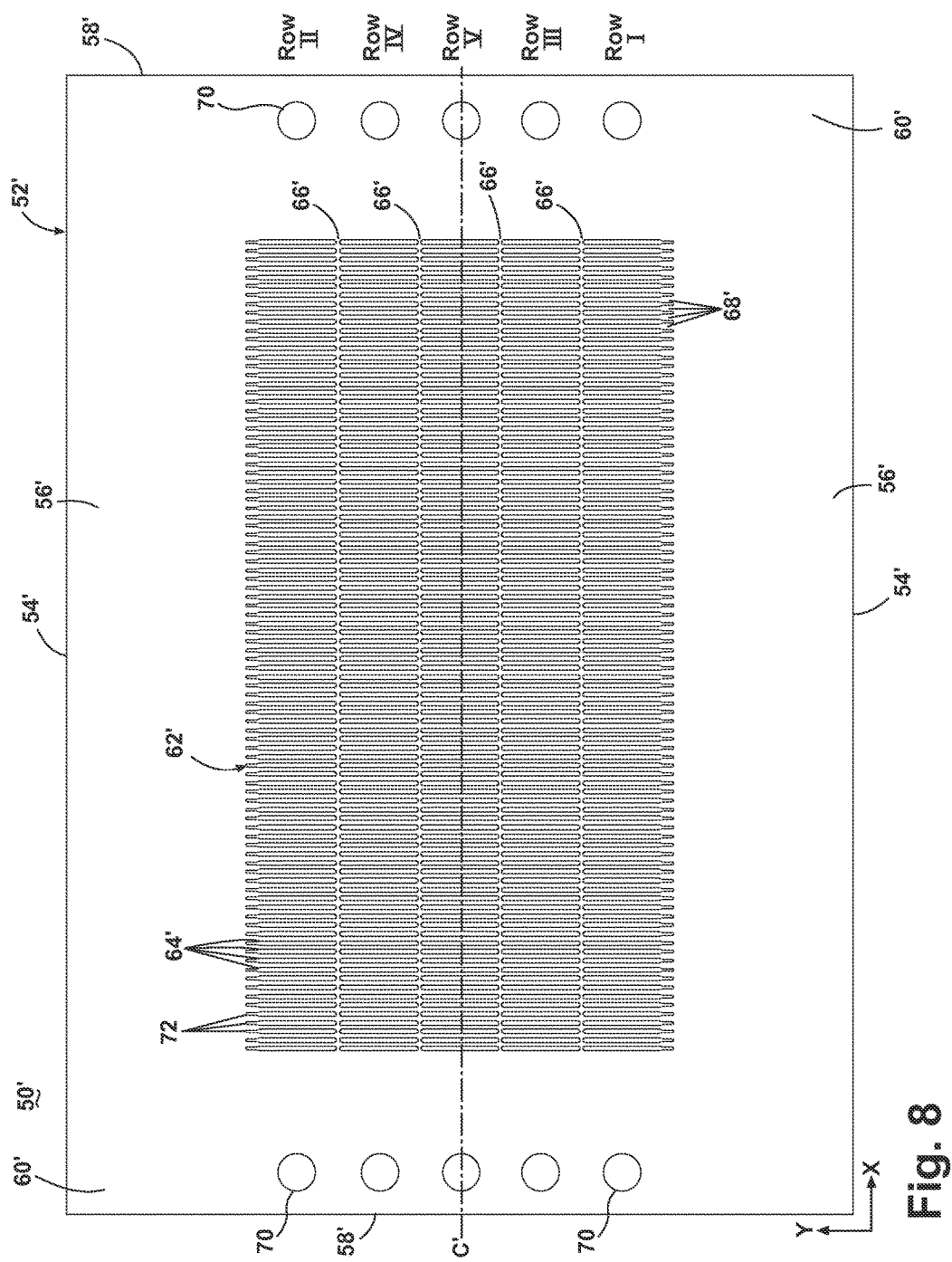
FIG. 8 is a plan view of another embodiment of a blank which can be used to make an anode according to the method of the invention.

The preformed features of the blank 50 can further include a series of openings 70 located in the end margins 60 of the sheet 62, generally along the end sides 58. The openings 70 can be formed by stamping, punching, laser cutting, or any other suitable method. The openings 70 are used during manufacture to maintain proper alignment of the blank 50 with respect to the die tool. As illustrated, five openings 70 may be provided in each end margin 60, and are each generally associated with one of the Rows I-V of slots 64, although other configurations are possible FIG. 8 is a plan view of another embodiment of a blank 50' which can be used to make an anode according to the method of the invention. The blank 50' can be substantially similar to the blank 50' of FIG. 7, but can include larger lateral margins 56'. Furthermore, for slots 64' located in Row I and Row II, the end of the slot 64' nearest the lateral margins 56' can comprise a pinched end which has a decreased width in comparison to the opposite end of the slots 64'. The blank 50' can have a thickness of approximately 0.5 mm in the Z-direction.

While not illustrated herein, it is also possible for the method of the invention. Whether making a cathode or an anode, to start with a blank having no preformed features. For example, a blank for either the cathode or the anode may not have any of the slots 64, 64' or openings shown in FIGS. 7-8 formed therein. Furthermore, it is also possible for a common blank to be used for both the cathode and the anode of the fuel cell.

Figure 9:
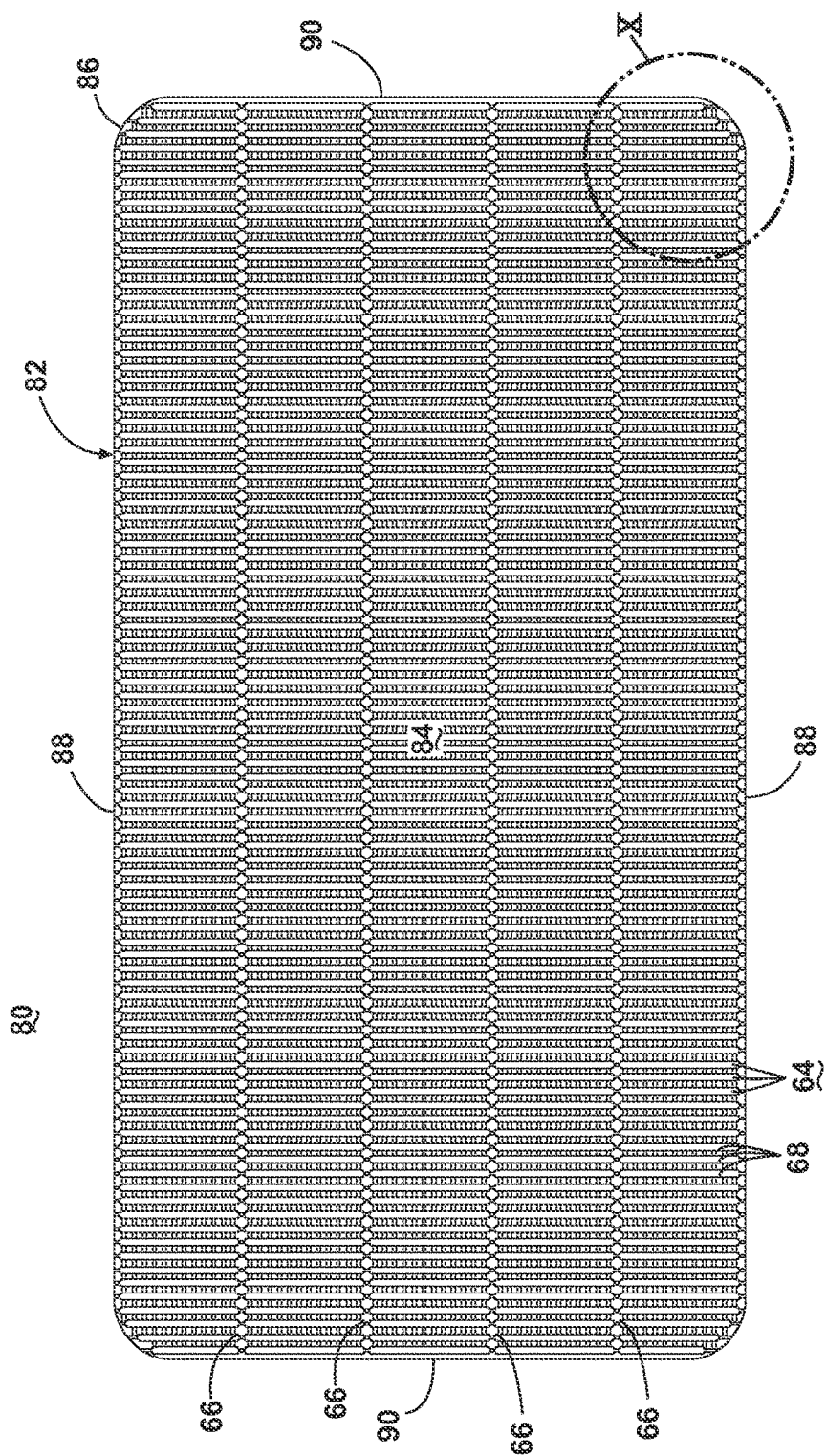
FIG. 9 is a plan view of a fuel cell electrode comprising a cathode manufactured according to the method of the invention.

FIG. 9 is a plan view of a fuel cell electrode comprising a cathode 80 which can be at manufactured according to the method of the invention. As shown, the cathode 80 can be at least partially manufactured using the die 10 of FIG. 1, and can further be manufactured from the blank 50 shown in FIG. 7. The cathode 80 comprises a cathode plate 82 having a flow field 84 generally located in the middle of the cathode plate 82 for distributing gaseous reactants (i.e. a fuel and an oxidant) and a coolant over the surface of the cathode 80. The cathode plate 82 includes an outer frame 86 comprising two spaced lateral struts 88 and two spaced end struts 90. The struts 88, 90 can be joined together at their ends to form curved corners of the frame 86. The cathode plate 82 further includes multiple inner lateral struts 66, preserved from the blank 50 that extend between the end struts 90, substantially parallel to the outer lateral struts 88. As illustrated, four inner lateral struts 66 are provided in substantially parallel relation to the outer lateral struts 88. The cathode plate 82 further includes multiple ribs 68, also preserved from the blank 50, that extend between the lateral struts 66, 88, substantially parallel to the end struts 90, and are substantially equally-spaced from each other. The frame 86, lateral struts 66, and ribs 68 together define the array of slotted openings 64 in the flow field 84.

Figure 10:
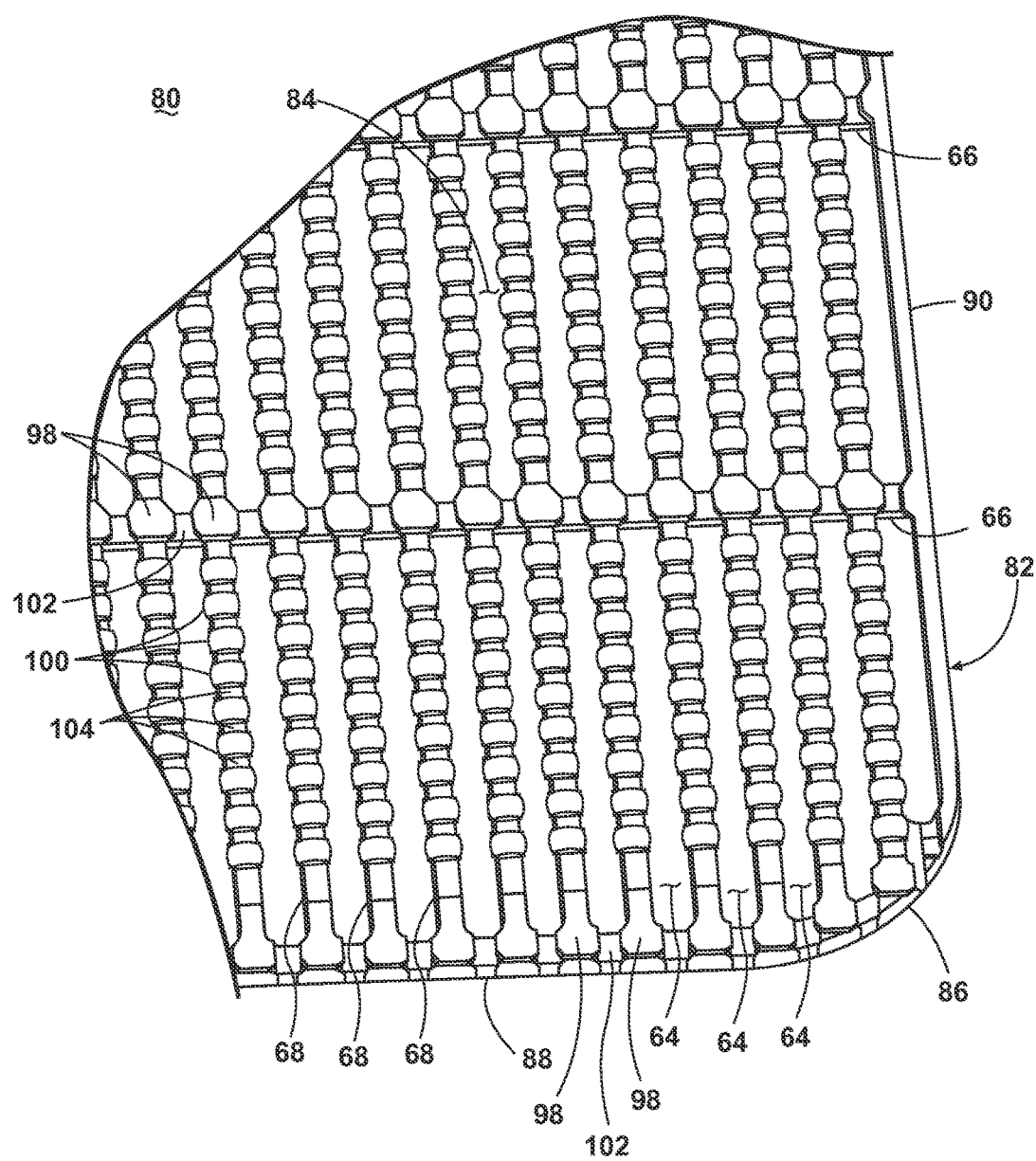
FIG. 10 is a close-up plan view of section X of FIG. 9.

FIG. 10 is a close-up, plan view of section X of FIG. 9. The flow field includes a plurality of lands 98 formed in the lateral struts 66, 88 and a plurality of lands 100 formed in the ribs 68 for engaging an electrolyte of a fuel cell. Pluralities of voids 102, 104 are respectively formed between the lands 98, 100, and, when assembled with an anode, form flow channels through which the gaseous reactants can flow through the flow field 84. In the embodiment shown, the end struts 90 do not include any voids.

Figure 11:
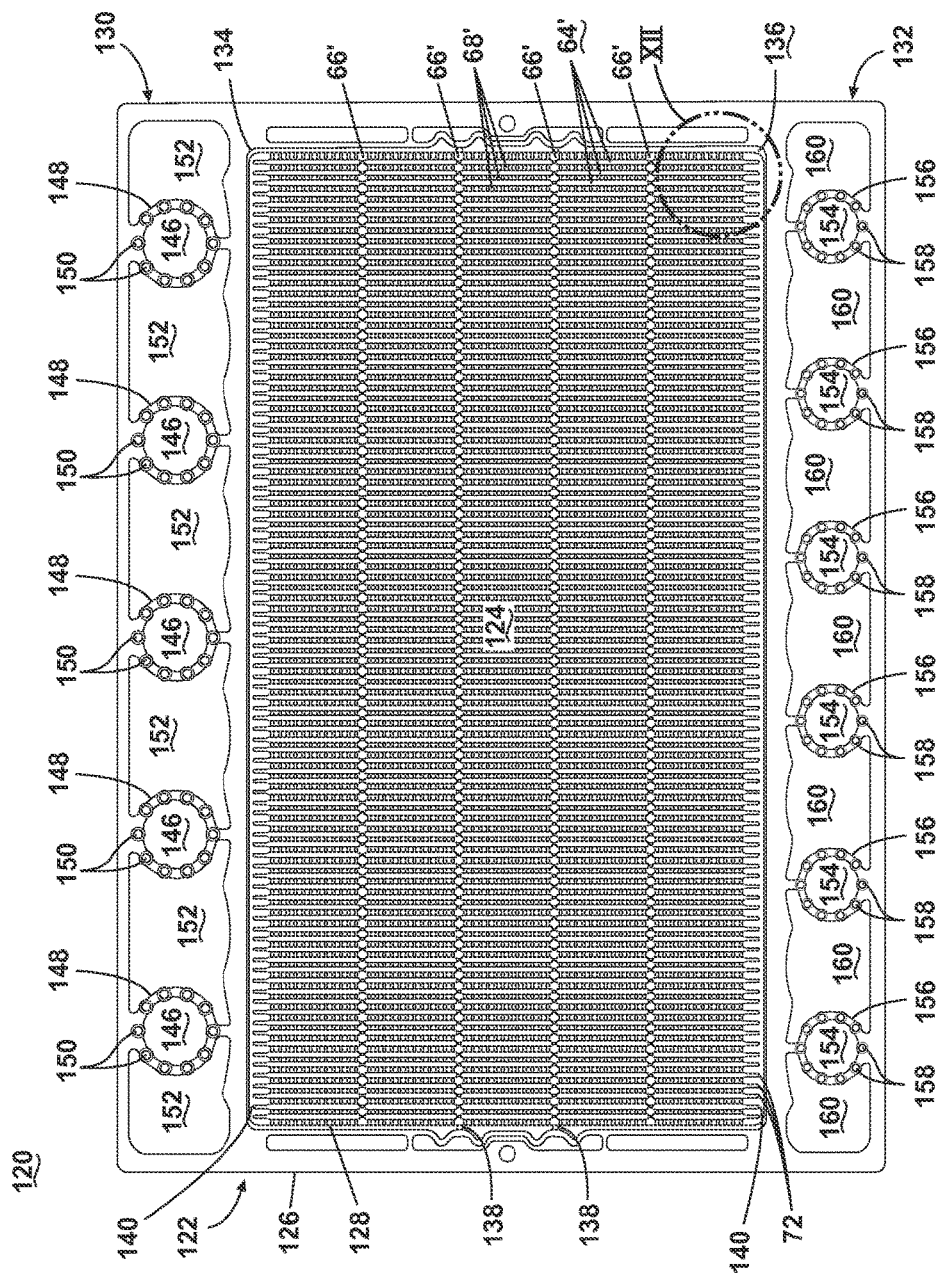
FIG. 11 is a plan view of a fuel cell electrode comprising an anode manufactured according to the method of the invention.

FIG. 11 is a plan view of a fuel cell electrode comprising an anode 120 manufactured according to the method of the invention. As shown, the anode 120 can be at least partially manufactured using the die 10 of FIG. 1, and can further be manufactured from the blank 50' shown in FIG. 8. The anode 120 comprises an anode plate 122 having a flow field 124 generally located in the middle of the anode plate 122 for distributing gaseous reactants (i.e. a fuel and an oxidant) and a coolant over the surface of the cathode 80. The anode plate 122 further includes an outer frame 126 and an inner frame 128 which defines the flow field 124.

The outer frame 126 comprises an inlet header portion 130 located on one lateral margin of the outer frame 126, and an outlet header portion 132 located on an opposite lateral margin of the outer frame 126. The outer frame 126 further comprises a central opening 134 Which is sized slightly larger than the inner frame 128, such that there is a gap 136 between the inner and outer frames 126, 128 on all sides of the inner frame 128. The inner frame 128 may be attached to the outer frame 126 by end connectors 138 that extend between the inner and outer frames 126, 128, The end margins of the outer frame 126 can be formed with other features and openings, not described herein.

The inner frame 126 comprising two spaced lateral struts 140 which are joined by ribs 68', preserved from the blank 50', and which extend between the lateral struts 140. The inner frame 126 further includes multiple inner lateral struts 66' preserved from the blank 50'. The lateral struts 66', 140 and ribs 68' together define the array of slotted openings 64' in the flow field 124. The end connectors 138 connecting the inner and outer frames 126, 128 may be formed by extensions of at least some of the lateral struts 66'.

The inlet header portion 130 includes a plurality of inlet apertures through which anode reactant gas or a coolant flows into the fuel cell. As shown, multiple oxidant inlets 146 are defined by inlet rings 148 in the inlet header portion 130. Each inlet ring 148 comprises a plurality of dimples 150 formed therein. Multiple fuel inlets 152 are also formed in the inlet header portion 130. adjacent to and between the oxidant inlets 146.

The outlet heater portion 132 includes a plurality of outlet apertures through which anode reactant gas or a coolant flows out of the fuel cell. As shown, multiple oxidant outlets 154 are defined by outlet rings 156 in the outlet header portion 132. Each outlet ring 156 comprises a plurality of dimples 158 formed therein. Multiple fuel outlets 160 are also formed in the outlet header portion 132, adjacent to and between the oxidant outlets 154.

Figure 12:
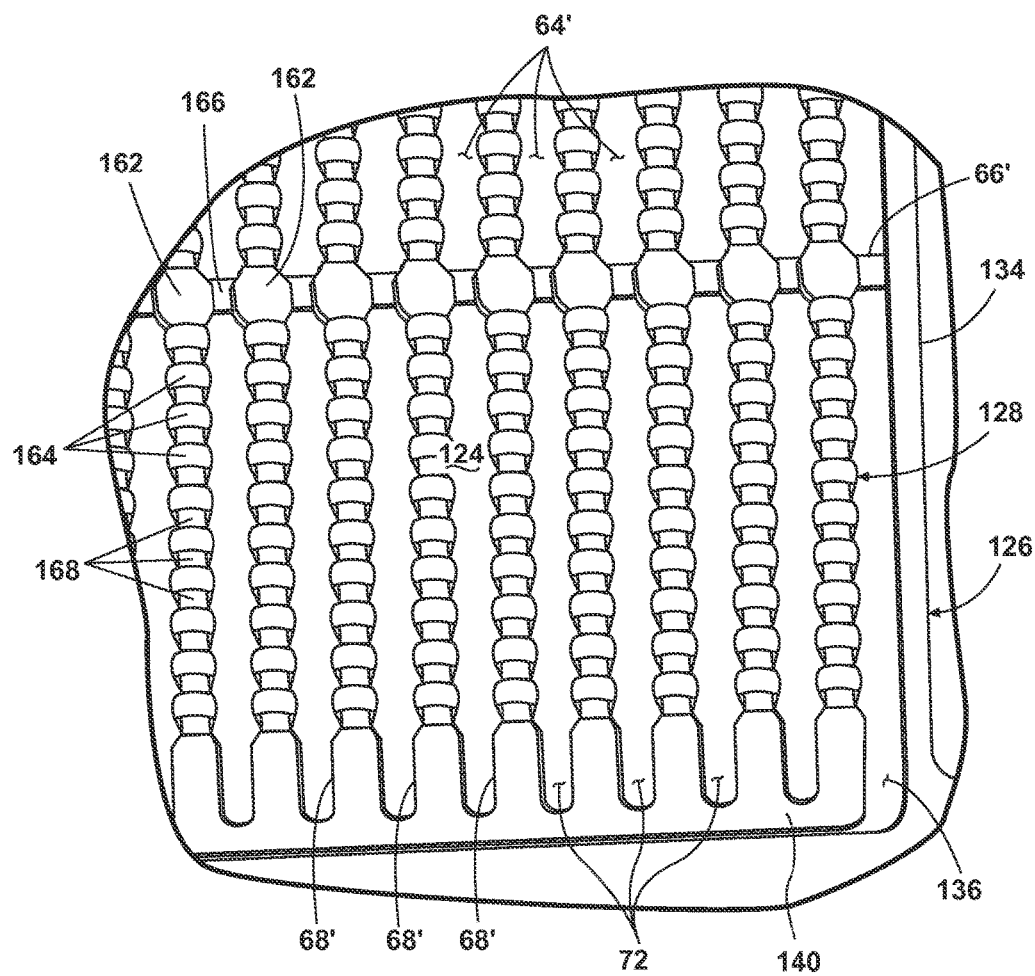
FIG. 12 is a close-up plan view of section XII of FIG. 11.

FIG. 12 is a close-up, plan view of section XII of FIG. 11. The flow field 124 includes a plurality of lands 162 formed in the lateral struts 66' and a plurality of lands 164 formed in the ribs 68' for engaging an electrolyte of a fuel cell. Pluralities of voids 166, 168 are respectively formed between the lands 162, 164, and, when assembled with a cathode, form flow channels through which the gaseous reactants can flow through the flow field 124.

FIG. 13 is a close-up, side view of a portion of the cathode 80 and anode 120 from FIGS. 9 and 11, respectively, and FIG. 14 is a close-up, top view of FIG. 13. As shown, the ribs 68, 68' of the cathode 80 and anode 120 can have similar lands and voids, and so will be described simultaneously. Each land 100, 164 can comprise an upper surface 106 and two depending side surfaces 108 that join the top surface 106 at one end thereof. At an opposite end, the side surfaces 108 join a lower surface 110, which together with the side surfaces 108 define the voids 104, 168. The lower surface 110 can have a planar curvature, such that the lower surface 110 can have a bowed surface when viewed from the perspective of FIG. 13. The side surfaces 108 can be angled, such that the ends of the side surfaces 108 joined to the lower surface 110 are closer together than the ends of the side surfaces 108 joined to the upper surface 106. Each side surface 108 can join the lower surface 110 at a corner edge 112. The corner edge 112 may be rounded, slightly pointed, or pointed, among other configurations. The corner edge 112 may define the lowest points on the flow field side of the rib 68, with the lower surface 110 curving upwardly from each corner edge 112 to define a highest point of the void 104, 168, which can be generally equidistant from either corner edge 112 of the void 104, 168.

FIG. 15 is a close-up, top view of a portion of a cathode and an anode at least partially manufactured using the die of FIG. 4. Specifically, FIG. 15 is a top view of the ribs 68, 68' of a cathode and an anode, respectively, at least partially manufactured using the die of FIG. 4. The ribs 68, 68' can be substantially similar to the ribs 68, 68' of FIG. 14, but can include a lower surface 110 have a convex curvature, such that the lower surface 110 can has a dome-like shape, with a high point of the lower surface 110 near the center of the lower surface 110.

The previously described cathode 80 and anode 120 can be manufactured using the method of the invention. Two embodiments of the method will now be described, one with respect to manufacturing the anode 120, and one with respect to manufacturing the cathode 80. However, it will readily be understood that the methods can broadly be applied to the manufacture of a fuel cell electrode, regardless of whether they are described herein for an anode or a cathode. Furthermore, the sequence of steps depicted is for illustrative purposes only, and is not meant to limit the method of the invention in any way, as it is understood that the steps may proceed in a different logical order, additional or intervening steps may be included, or described steps may be divided into multiple steps, without detracting from the invention. The embodiments of the method function to produce a fuel cell electrode with controlled material growth.

Figure 16:
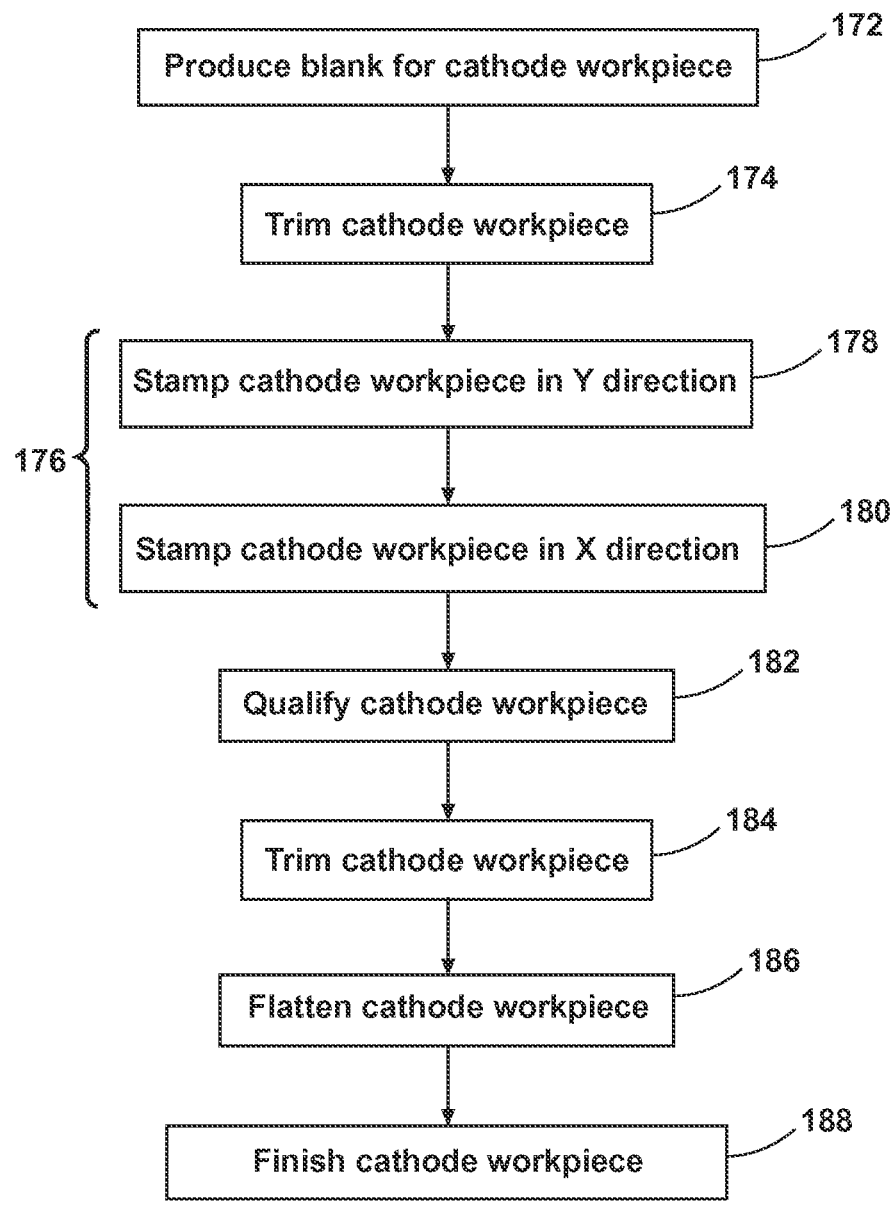
FIG. 16 is a flow chart of depicting a method for manufacturing a fuel cell cathode in accordance with another embodiment of the present invention.

Referring to FIG. 16, a flow chart of depicting a method 170 for manufacturing a fuel cell cathode in accordance with the present invention is shown. The method may be executed using various manufacturing operations, such as high speed stamping, progressive transfer stamping, fine tool application, laser cutting, and turret machining. The method 170 be described with respect to the blank 50 of FIG. 7 and the cathode 80 of FIGS. 9-10, although it is understood that the method 170 may utilize different blanks or may be used to produce cathodes other than the cathode 80 shown herein.

The first step 172 in the manufacturing process is producing a blank for use the cathode workpiece. Processes for producing blanks are well-known in the art, and will not be described in detail herein. As discussed above, the blank can have no pre-formed features, or can have the features shown in the blank 50 of FIG. 7.

Next, the workpiece undergoes a first trimming operation at step 174. The trimming operation can be performed by a laser or by stamping. For example, for a blank without any pre-formed features, the initial trim step 174 can include the formation of the slots 64 and openings 70 shown in the blank 50 of FIG. 7. If the blank already has pre-formed features, the first trimming operation at step 174 can be eliminated.

Next, the trimmed workpiece undergoes a stamping operation at step 176 to create the voids 102, 104 shown in FIG. 10. The voids 102, 104 can be stamped into the slotted region 62 of the blank 50 shown in FIG. 7; as such, the lands 98, 100 are necessarily also defined in the slotted region 62 by the stamping step 176.

The stamping operation can includes a two-step process. In the first stamping step 178, the workpiece is stamped along the Y-direction of the workpiece to create the voids 102 in the struts 66. The Y-direction stamping can be configured to control material growth. In particular, a stamping sequence in which the workpiece is struck near the centerline C of the slotted region 62 first, and then sequentially struck by indexing toward the outside of the slotted region 62 has been found to minimize material growth. For the cathode 80 shown herein, a sequence of three hits can be used to create the voids 102 in the struts 66. The workpiece is first struck near the centerline C of the slotted region 62 to create voids in the two innermost struts 66, i.e. the struts 66 bordering Row III. Next, the workpiece or the die is indexed to align the die with one of the outer struts 66 and lateral margins 56, i.e. the portion of the blank 50 bordering Row V, and the workpiece is struck for the second time to create voids 102 in the outer strut 66 and lateral margin 56. Finally, the workpiece or die is indexed again to align the die with the remaining strut 66 and lateral margin 56, i.e. the portion of the blank 50 bordering Row I, and the workpiece is struck for the third time to create voids 102 in the remaining strut 66 and lateral margin 56.

In the second stamping step 180, the workpiece is stamped along the X-direction to create voids 104 in the ribs 68. The X-direction stamping can be configured to control material growth. In particular, a stamping sequence in which the workpiece is struck near one lateral margin 56 of the slotted region 62 first, and then sequentially struck by indexing closer toward the centerline C of the slotted region 62 has been found effective to control material growth. For the cathode 80 shown herein, a sequence of five hits can be used to create the voids 104 in the ribs 68. The workpiece is first struck near one lateral margin 56 of the slotted region 62 to create voids 104 in the ribs 68 of Row I. Next, the workpiece or the die is indexed to align the die with Row II, and the workpiece is struck for the second time to create voids 104 in the ribs 68 of Row II. Next, the workpiece or the die is indexed to align the die with Row III, and the workpiece is struck for the third time to create voids 104 in the ribs 68 of Row III. Next, the workpiece or the die is indexed to align the die with Row IV, and the workpiece is struck for the fourth time to create voids 104 in the ribs 68 of Row IV. Finally, the workpiece or the die is indexed to align the die with Row V, and the workpiece is struck for the fifth time to create voids 104 in the ribs 68 of Row V.

Next, the stamped workpiece can undergo a qualifying operation at step 182 to ensure that the voids 102, 104 have a substantially uniform height. The qualifying operation can be performed by a flattening die, which flattens any lands 98, 100 on the workpiece that are too high, or outside the tolerances for the cathode 80.

Next, the workpiece can undergo a second trim step 186, in which the perimeter of the workpiece is removed. For example, with respect to the blank 50 shown in FIG. 7, the lateral margins 56 and end margins 60 of the workpiece can be trimmed off, leaving the workpiece with the outer frame 86 of the cathode 80 shown in FIG. 9.

Next, if there is a significant bend or curve in the workpiece, the workpiece can undergo a flattening operation at step 186. For example, the workpiece can undergo flat rolling, in which the workpiece is passed through a pair of rollers that rotate in opposite directions. The distance between the rollers can be set such that any bend or curve in the workpiece is removed without significantly deforming the workpiece. After this step, the workpiece will have generally the same appearance as the cathode 80 shown in FIG. 9.

Finally, the workpiece can undergo a finishing operation at step 188, such as, but not limited to deburring. The workpiece may have raised portions or burrs, which can be removed at step 188 using a manual deburring process. Other types of deburring processes that may be used include, but are not limited to, electrochemical deburring and thermal deburring. After the workpiece is finished and cleaned, it can be inspected for quality.

Figure 17:
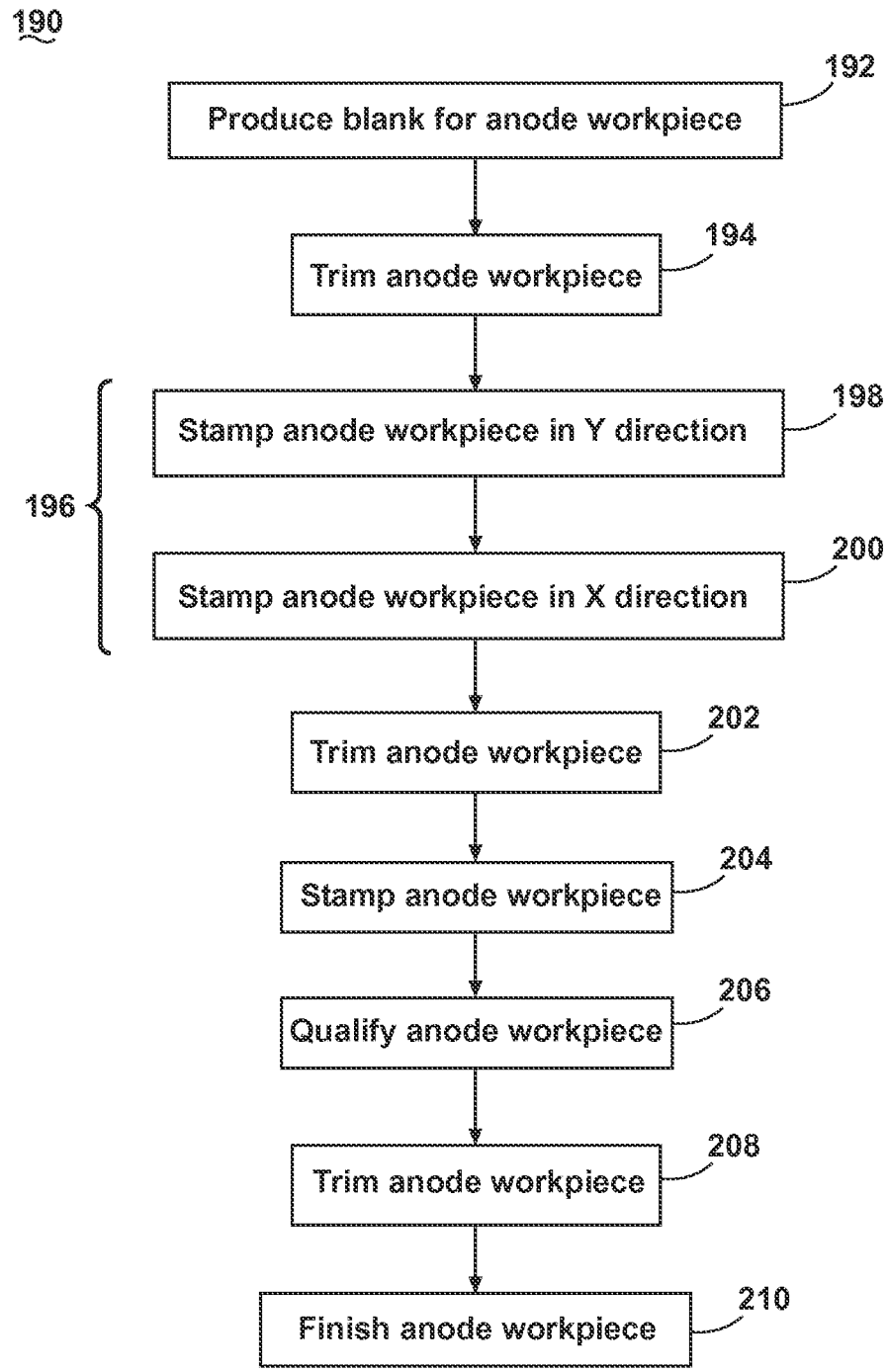
FIG. 17 is a flow chart of depicting a method for manufacturing a fuel cell anode in accordance with one embodiment of the present invention.

FIG. 17 a flow chart of depicting a method 190 for manufacturing a fuel cell anode 120 in accordance with one embodiment of the present invention. The method 190 may be executed using various manufacturing equipment, such as high speed stamping, progressive transfer stamping, fine tool application, laser cutting, and turret machining. The method 190 will be described with respect to the blank 50' of FIG. 8 and the anode 120 of FIGS. 11-12, although it is understood that the method 190 may utilize different blanks or may be used to produce anodes other than the anode 120 shown herein.

The first step 192 in the manufacturing process is producing a blank for use the anode workpiece. Processes for producing blanks are well-known in the art, and will not be described in detail herein. As discussed above, the blank can have no performed features, or can have the features shown in the blank 50' of FIG. 8.

Next, the workpiece undergoes an initial trimming operation at step 194. The trimming operation can be performed by a laser or by stamping. The initial trim step 194 may be configured to remove predetermined portions of the workpiece in such a manner that allows for some material growth during subsequent steps of the method. The initial trim step 194 can also be configured to remove portions of the blank that will help maintain the flatness of the blank during the manufacturing by reducing the stress within the material. Specifically, for the anode shown in FIG. 11, the gap 136 can be formed in the workpiece to generally define the outer and inner frames 126, 128 of the anode 120. The gap 136 permits the inner frame 128 to undergo some material growth, while substantially preventing material growth in the outer frame 126. The gap 136 also reduced the stress within the material. The gap 126 will be disrupted by the end connectors 138 between the outer and inner frames 126, 128. While not shown in FIG. 11, at this stage of the method, the outer and inner frames 126, 128 will be connected by four end connectors 128 on each end margins 60. For a workpiece comprising blank without any preformed features, the initial trim step 194 can include the formation of the slots 64' and openings 70' shown in the blank 50' of FIG. 8.

Next, the trimmed workpiece undergoes a first stamping operation at step 196 to create the voids 166, 168 shown in FIG. 12. The voids 166, 168 are stamped into the slotted region 62' of the blank 50' shown in FIG. 8; as such, the lands 162, 164 are necessarily also defined in the slotted region 62' by the stamping step 176.

The first stamping operation 196 can include a two-step process. In the first stamping step 198, the workpiece is stamped along the Y-direction of the workpiece to create voids 166 in the struts 66'. Due to the configuration of the anode 120 shown in FIG. 11, material growth in the Y-direction is not as much of concern as it may be for the cathode 80. For the anode 120 shown herein, a sequence of two hits can be used to create the voids 166 in the struts 66'. The workpiece is first struck on one side the centerline C of the slotted region 62' to create voids 166 in the struts 66' bordering Row IV. Next, the workpiece or the die is indexed to align the die with the two other struts 66' and the workpiece is struck for the second time to create voids 166 in the struts 66' bordering Row II on the other side of the centerline C of the slotted region 62'.

In the second stamping step 200, the workpiece is stamped along the X-direction to create voids 168 in the ribs 68'. The X-direction stamping can be configured to control material growth. In particular, a stamping sequence in which the workpiece is struck near one lateral margin 56' of the slotted region 62' first, and then sequentially struck by indexing closer toward the centerline C of the slotted region 62' has been found effective to control material growth. For the anode 120 shown herein, a sequence of five hits can be used to create the voids 168 in the ribs 68'. The workpiece is first struck near one lateral margin 56' of the slotted region 62' to create voids 168 in the ribs 68' of Row I. Next, the workpiece or the die is indexed to align the die with Row II, and the workpiece is struck for the second time to create voids 168 in the ribs 68' of Row II. Next, the workpiece or the die is indexed to align the die with Row III, and the workpiece is struck for the third time to create voids 168 in the ribs 68' of Row III. Next, the workpiece or the die is indexed to align the die with Row IV, and the workpiece is struck for the fourth time to create voids 168 in the ribs 68' of Row IV. Finally, the workpiece or the die is indexed to align the die with Row V, and the workpiece is struck for the fifth time to create voids 168 in the ribs 68' of Row V.

Next, the workpiece can undergo a second trim step 202. After the stamping operation, the workpiece may have concave lateral sides, since material growth will be concentrated in the corners of the workpiece. During the second trim step 202, the lateral sides are trimmed to straighten them. The trimming operation can be performed by a laser or by stamping.

Next, the workpiece undergoes a third stamping operation at step 204 to create the dimples 150, 158 in the areas that will become the inlet and outlet header portions 130, 132 of the anode 120. The second stamping operation 204 can use a dimple die to crate the circular patterns of dimples 150, 158 shown in FIG. 11.

Next, the stamped workpiece can undergo a qualifying operation at step 206 to ensure that the dimples 150, 158 have a substantially uniform height and that the voids 166, 168 have a substantially uniform height. The qualifying operation can include a two-step process. In the first qualifying step, a flattening die can be used on the dimples 150, 158 to ensure that the dimples 150, 158 have a uniform height in comparison to each other by flattening any dimples 150, 158 that are too high, or are outside the tolerances for the anode 120. In the second qualifying step a flattening die can be used on the inner frame 128 to ensure that the voids 166, 168 have a substantially uniform height in comparison to each other by flattening any lands 162, 164 on the workpiece that are too high, or outside the tolerances for the anode 120. While described as a two-step process, the qualify operation can be performed simultaneously on the dimples 150, 158 and voids 166, 168, or in sequence.

Next, the workpiece can undergo a third trim step 208, in which the workpiece undergoes another trimming operation, The third trim step 208 may be configured to remove predetermined portions of the workpiece to form the final shape of the anode 120 shown in FIG. 11, such as cutting all remaining perimeter features. For example, the oxidant inlets 146, fuel inlets 152, oxidant outlets 154, and fuel outlets 160 can be cut into the workpiece. Also, the end connectors 138 nearest the header portions 130, 132 can be trimmed off to release portions of the inner frame 128 from the outer frame 126, leaving the two innermost end connectors 138 intact to preserve the coupling of the outer and inner frames 126, 128. The trimming operation can be performed manually, i.e. by hand, or automatically, such as by a laser or by stamping, or any combination thereof. After this step, the workpiece will have generally the same appearance as the anode 120 shown in FIG. 11.

Finally, the workpiece can undergo a finishing operation at step 210, such as, but not limited to deburring. The workpiece may have raised portions or burrs, which can be removed at step 210 using a manual deburring process. Other types of deburring processes that may be used include, hut are not limited to, electrochemical deburring and thermal deburring. After the anode workpiece is finished and cleaned, it can be inspected for quality.

The die and/or stamping method of the present invention can be employed to produce a fuel cell electrode in which material growth during stamping in minimize. For example, for the cathode 80 and anode 120 shown herein, material growth in the Y-direction direction can be limited to no more than 1 mm.

While the invention has been specifically described in connection with certain specific embodiments thereof, it is to be understood that this is by way of illustration and not of limitation, and the scope of the appended claims should be construed as broadly as the prior art will permit. It is to be understood that the specific devices and processes illustrated in the attached drawings, and described in the specification are simply exemplary embodiments of the inventive concepts defined in the appended claims. Hence, specific dimensions and other physical characteristics relating to the embodiments disclosed herein are not to be considered as limiting, unless the claims expressly state otherwise.

What is claimed is:

1. A method of manufacturing a fuel cell electrode comprising:
   providing a blank work piece having a slotted region with slots in rows separated from each other by struts along an X-direction and columns separated from each other by ribs along a Y-direction, and defining a centerline C extending through the middle of the slotted region along the X-direction;
   sequentially stamping the blank work piece with a die along the Y-direction to create voids and lands in the struts; and
   sequentially stamping the blank work piece with the die along the X-direction to create voids and lands in the ribs;
   wherein the stamping sequence is configured to minimize material growth.

2. The method of claim 1 wherein the stamping sequence along the Y-direction is first striking the blank work piece near the centerline C and then sequentially striking the blank work piece toward the outside of the slotted region.

3. The method of claim 2 wherein the stamping sequence along the Y-direction comprises three strikes.

4. The method of claim 1 wherein the stamping sequence along the X-direction is first striking the blank work piece near a lateral margin of the slotted region and then sequentially striking the blank work piece toward the centerline C.

5. The method of claim 4 wherein the stamping sequence along the X-direction comprises five strikes.

6. The method of claim 1 further comprising one of qualifying the stamped work piece to ensure that the voids have a substantially uniform height, trimming the stamped work piece, flattening the stamped work piece, and finishing the stamped work piece.

7. The method of claim 1 further comprising preforming the blank work piece with the slotted region.

8. The method of claim 1 further comprising a third stamping step to create dimples in areas that will become inlet and outlet header portions of an anode.

9. The method of claim 1 wherein the die comprises a die face having a plurality of raised projections, each raised projection having a top surface and lateral sides, each lateral side joined to the top surface at a raised shoulder, wherein the top surface is concave having a nadir equidistant from the shoulders, and wherein adjacent projections are separated from each other by a plateau.

10. The method of claim 9 wherein the top surface is concave in a single plane.

11. The method of claim 9 wherein the top surface (is concave in at least two perpendicular planes such that each projection has four raised corners.

12. The method of claim 9 wherein the lateral sides are angled.

13. The method of claim 9 wherein each projection extends generally along a length of the die face parallel to a side surface of the die.

14. The method of claim 9 wherein the projections are arranged in a grid-like pattern across the die face.

15. The method of claim 6 further comprising preforming the blank work piece with the slotted region.

* * * * *